UNITED STATES PATENT OFFICE.

RUDOLF ZIEGENBERG, OF BERLIN, GERMANY.

PROCESS OF CHARGING LEAD-PEROXID-ZINC STORAGE BATTERIES.

No. 912,251.   Specification of Letters Patent.   Patented Feb. 16, 1909.

Application filed August 3, 1907. Serial No. 387,634.

*To all whom it may concern:*

Be it known that I, RUDOLF ZIEGENBERG, a subject of the German Emperor, residing at Berlin, Germany, have invented new and useful Improvements in Processes of Charging Lead-Peroxid-Zinc Storage Batteries; of which the following is a specification.

This invention relates to improvements in the process of charging lead-peroxid-zinc storage batteries.

It is well known that the lead-zinc battery in spite of its principal advantage viz. that of high capacity has not been able to be put to continuous practical use owing to serious inconveniences adherent to the negative zinc electrode. The zinc is on the one hand not sufficiently resistant to the action of the acid even if carefully amalgamated, and further belongs to a class of metals which do not readily take electric precipitation as is well known in electrometallurgical and galvanoplastic work. A regular and firmly adherent precipitate of zinc is impossible if a highly acidulated solution is used. Unfortunately this very unfavorable condition exists in the lead-peroxid-zinc storage battery, which still contains a quantity of surplus acid in the electrolyte after discharging. For this reason it is practically impossible to recharge the lead-zinc battery under the same conditions in which it is discharged. Nevertheless if this is done the main feature of the battery, viz. its high capacity, is destroyed after the first discharge, not to mention other disadvantages. Therefore after many unsuccessful trials it has been generally assumed that the lead-zinc element cannot be considered as a secondary battery but only as an ordinary primary cell, in which the electric energy is produced only by solution and consumption of the zinc. To adapt this for continuous practical application therefore this inconvenience must be removed in the first instance in such a manner, that the elements can be regularly charged. Two distinct effects are to be noticed by the action of the acid liberated during the discharge. As previously mentioned, it is impossible to obtain a regular firmly adherent precipitate by using a highly acidulated solution, but on the contrary so-called zinc-blooms, leaves and fan-shaped bodies are formed which with longer charging and a small distance between the positive and negative plates may cause direct short circuit, and afterwards, under the influence of the acid, fall off easily from the zinc-plates to the base of the cell thus causing there a short-circuit and being entirely dissolved. The free acid has still the further objectionable result that a large proportion of the zinc precipitated by the current is dissolved in the surplus acid at the same instant or shortly afterwards to such an extent that in proportion to the theoretical quantity of zinc, up to 70% of the latter precipitated by the current is soon afterwards again dissolved. The zinc dissolved during the previous discharge is thus very incompletely recovered, and in addition the electrolyte contains a large quantity of zinc sulfate, a fact which further reduces the capacity of the battery.

The first consideration is to neutralize the influence of the liberated acid in such a manner however that, by such neutralization, the regular charging of the positive plates is not interfered with or injured and especially that the initial capacity of the battery is retained. The essential condition for the production or retention of high capacity is the use of a diluted sulfuric acid of a density which, after the discharge, still gives a large surplus of acid and which does not produce a good deposit. It thus follows firstly that a charging of the element which will fulfil all practical requirements must take place in some other liquid than in the electrolyte most favorable for discharging. It is obviously favorable to use as such liquid the zinc baths well known in galvanoplastic work which produce the best zinc precipitates, viz. a neutral or a slightly acidulated solution of zinc sulfate. As in this case zinc is also used as the positive electrode, the acid freed by the decomposition of the zinc sulfate into zinc and sulfuric acid is simply so neutralized that at the positive electrode a portion equal to the quantity of zinc precipitated by the current is continuously dissolved by said freed acid so that the latter is neutralized and at the same time fresh zinc is supplied to the bath itself, which thus permanently possesses the same composition. The application of this method to the charging of the lead-zinc battery is impossible for the reason that lead peroxid is used therein as the positive electrode. Otherwise the positive lead peroxid plates have to be charged separately which in addition to other practical disadvantages would involve a prohibitive increase in the cost of the charging operation.

If for charging the bath an ordinary neutral solution of zinc sulfate is used the charging is favorable at the commencement but as with the increasing decomposition of the zinc sulfate the freed acid enters more into action, the previously mentioned objections to the charging process result. Moreover care must thus be taken to obtain a continuous neutralization of the acid freed independently of the positive plate. This is obtained according to the present invention in the following manner. The positive and negative plates are suspended in a slightly acidulated, that is to say, almost neutral solution of zinc sulfate, and in addition to these plates metallic zinc insertions having no electrical connection with the other circuit are also suspended in the charging bath, said zinc insertions having the form of plates or other suitably shaped zinc pieces. For this purpose even small zinc pieces chips or the like placed in suitable perforated vessels of glass, or porcelain may be used. The free acid then dissolves said zinc pieces in proportion to its liberation and is thus neutralized in the same manner. Instead of using metallic zinc for this purpose certain zinc compounds which, together with the liberated acid produce zinc sulfate, may be equally applied with particular advantage. Such compounds are zinc-oxid and zinc-hydrate which dissolve even more easily than metallic zinc and their use is particularly advantageous in combination with the further method of recovering zinc described in the specification of a further application made concurrently herewith. The said zinc compounds are added in surplus to the charging bath and neutralize the acid according as the latter becomes liberated during the charging. This continuous neutralization of the acid need not however necessarily take place in the charging bath itself but may with advantage be effected in a separate or special receptacle communicating with said bath. The substances required for the neutralization viz. metallic zinc or zinc compounds are placed in said auxiliary receptacles and dissolved preferably by means of heat. For the purpose of obtaining a good mixture with the liquid in the main charging vessel said liquid may be put into circulation by any suitable means. This may be done either mechanically by a stirring device of suitable construction or by compressed air introduced into the charging bath through a pipe system provided with openings similarly to a heating coil. By causing the liquid to circulate as aforesaid the gas-bubbles at the zinc-plates formed during charging are at the same time continuously removed, whereby the uniformity and density of the zinc precipitate is greatly increased.

In carrying this particular charging process into practice, vessels serving for charging are filled at the commencement with a neutral or slightly acidulated saturated solution of zinc sulfate diluted, for instance, with twice its volume of water and the charging is effected in such vessels without particular neutralization. The size of the vessels is so chosen that the acid developed during the charging of a set of plates is not sufficient to allow the above mentioned unfavorable effects to appear to any considerable extent, that is to say, the charging is carried out in a bath so large (i. e. with so much liquid) that the free acid developed is uniformly distributed, the acid being thus highly diluted to reduce injurious effects. At the end of the charging the free acid is neutralized as stated above. When the charged plates are removed a quantity of metallic zinc or preferably zinc oxid or zinc hydrate which may be easily determined by practice, is placed in the charging bath and dissolved therein. This is suitably effected by means of heat and may be easily carried out by blowing in steam. Should the charging bath become too hot for charging the positive lead-peroxid plates the temperature may be reduced to the required degree by blowing in cold air. The bath is then again in the same condition as before the first charging that is to say, the requisite zinc compounds have been added to the bath and the acid liberated by the first charge has been neutralized.

The present charging process is characterized by the following novel features, firstly the charging takes place in a different liquid to the discharging in order to permit a regular simultaneous charging of both the positive and negative plates while preserving the high capacity peculiar to this kind of battery, and secondly the acid liberated by the simultaneous charging of the positive and negative plates is permanently neutralized by special means which do not interfere unfavorably with the charging process in any way.

Having thus described my invention, what I claim as new and desire to secure by Letters Patent is:—

1. The process of charging lead-peroxid-zinc storage batteries, consisting in placing the positive and negative plates, normally dischargeable in sulfuric acid, in a substantially neutral solution of zinc sulfate, and in maintaining the charging bath in a substantially neutral condition by inserting therein zinc, not in electrical connection with the plates, substantially as described.

2. The process of charging lead-peroxid-zinc storage batteries, consisting in placing the positive and negative plates, normally dischargeable in sulfuric acid, in a substantially neutral solution of zinc sulfate, and in inserting zinc in the same solution, and separated from the plates, and in agitating the liquid to promote intimate mixture and to remove gas bubbles from the negative plates, substantially as described.

In testimony whereof I have signed my name to this specification in the presence of two subscribing witnesses.

RUDOLF ZIEGENBERG

Witnesses:
   OTTO KYBURG,
   ARTHUR LICHTENFELD.